United States Patent
Kimura et al.

(10) Patent No.: US 11,084,260 B2
(45) Date of Patent: Aug. 10, 2021

(54) COMPOSITE SHEET MATERIAL

(71) Applicant: Toray Industries, Inc., Tokyo (JP)

(72) Inventors: Shunichi Kimura, Otsu (JP); Gen Koide, Otsu (JP); Makoto Nishimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 53 days.

(21) Appl. No.: 16/613,862

(22) PCT Filed: Apr. 2, 2018

(86) PCT No.: PCT/JP2018/014082
§ 371 (c)(1),
(2) Date: Nov. 15, 2019

(87) PCT Pub. No.: WO2018/211838
PCT Pub. Date: Nov. 22, 2018

(65) Prior Publication Data
US 2021/0070024 A1 Mar. 11, 2021

(30) Foreign Application Priority Data
May 18, 2017 (JP) .............................. JP2017-099059

(51) Int. Cl.
*B32B 27/12* (2006.01)
*B32B 5/02* (2006.01)
*B32B 7/12* (2006.01)
*B32B 27/30* (2006.01)
*B32B 27/36* (2006.01)
*B32B 27/40* (2006.01)

(52) U.S. Cl.
CPC ............. *B32B 27/12* (2013.01); *B32B 5/024* (2013.01); *B32B 7/12* (2013.01); *B32B 27/306* (2013.01); *B32B 27/36* (2013.01); *B32B 27/40* (2013.01); *B32B 2255/02* (2013.01); *B32B 2262/0284* (2013.01)

(58) Field of Classification Search
CPC ............ B32B 27/12; B32B 7/12; B32B 5/024
USPC ........................................................ 428/222
See application file for complete search history.

(56) References Cited

U.S. PATENT DOCUMENTS

2002/0018892 A1* 2/2002 Satake ................. C08G 18/283
428/355 R
2015/0252524 A1* 9/2015 Nishimura ................ D01F 6/84
428/338

FOREIGN PATENT DOCUMENTS

| JP | 2006-088504 A | 4/2006 |
| JP | 2007-203685 A | 8/2007 |
| WO | 2009/064515 A1 | 5/2009 |
| WO | 2013/035559 A1 | 3/2013 |
| WO | 2015/029453 A1 | 3/2013 |
| WO | 2014/034780 A1 | 3/2014 |

* cited by examiner

*Primary Examiner* — Betelhem Shewareged
(74) *Attorney, Agent, or Firm* — DLA Piper LLP (US)

(57) ABSTRACT

A composite sheet material includes a skin sheet and a woven fabric, wherein the skin sheet is formed by impregnating an elastic polymer into a base material consisting of an entangled fiber network, such as a nonwoven fabric, and wherein the composite sheet material has high thermal resistance and high formability suitable for integral molding. The composite sheet material is a composite sheet material including a skin sheet attached with a woven fabric through an adhesive resin layer, wherein the skin sheet is made of an entangled fiber network including ultra-fine fibers with an average single fiber diameter of 0.1 to 8 μm and of an elastic polymer, and wherein the woven fabric includes polyester fibers in which the polyester contains a 1,2-propanediol-derived component at a concentration of 1 to 500 ppm.

3 Claims, No Drawings

COMPOSITE SHEET MATERIAL

TECHNICAL FIELD

This disclosure relates to a composite sheet material, particularly to a composite sheet material comprising a skin sheet attached with a woven fabric through an adhesive resin layer, wherein the skin sheet is formed by impregnating an elastic polymer, also known as a polymeric elastomer, into an entangled fiber network such as a non-woven fabric composed of ultra-fine fibers.

BACKGROUND

Sheet materials comprising an entangled fiber network such as a non-woven fabric mainly composed of ultra-fine fibers and an elastic polymer have superior properties such as durability and uniformity to those of natural leather. Among those, sheet materials, suede-like artificial leather, which have been buffed to raise the nap of the surface are used not only as materials for clothing, but also as materials in a variety of fields, including vehicle interior materials, furniture materials, building materials and the like.

An integral molding technique may be applied to suede-like artificial leather when the resulting products are used for articles in the above-described fields such as vehicle interiors. In this respect, integral molding is a molding technique used to combine an artificial leather material and a resin material together to create molded parts in which the artificial leather material is placed into a mold for a part design of interest, and the resin material is then injected into the mold toward the back surface of the artificial leather material. Major problems of the integral molding technique include effusion of molten resin on the surface of artificial leather, and degradation of artificial leather due to high temperature of molten resin.

For such an integral molding process, a method using heat fusible fibers for bonding an outer knit layer to a non-woven fabric layer is proposed as a method to produce sheet materials with high formability and resistance to stain (see JP 2006-88504 A). However, the proposed method has a problem in that the elegant appearance of suede-like artificial leather, if used as a leather material, will be greatly impaired by heat during the bonding process at a bonding temperature of 160° C., in which fibers with a melting point of 140° C. are used as the heat fusible fibers.

On the other hand, leather-like materials comprising an outer non-woven fabric layer integrated with a heat fusible fiber layer by fiber entanglement have been proposed with respect to the integral molding process, in which the outer non-woven fabric layer is made of ultra-fine fibers and the heat fusible fiber layer is formed on a woven fabric by fiber entanglement through high-performance liquid processing (see JP 2007-203685 A). The heat fusible fibers in the proposed leather-like materials can be melted by heat from the wall of a mold and formed into products with no stains caused by resin penetration. However, the leather-like materials obtained have insufficient strength to be used for vehicle interiors, furniture articles and the like.

It therefore could be helpful to provide a composite sheet material comprising a skin sheet attached with a woven fabric through an adhesive resin layer, wherein the skin sheet is formed by impregnating an elastic polymer into an entangled fiber network such as a non-woven fabric, composed of ultra-fine fibers, and wherein the composite sheet material has not only such high formability, but also such high strength even after a forming process that composite sheet material can be suitably used especially in vehicle interiors, furniture articles and the like.

SUMMARY

We thus provide:

A composite sheet material comprises a skin sheet attached with a woven fabric through an adhesive resin layer, wherein the skin sheet is made of an entangled fiber network comprising ultra-fine fibers with an average single fiber diameter of 0.1 to 8 μm and of an elastic polymer, and wherein the woven fabric comprises polyester fibers, in which the polyester contains a 1,2-propanediol-derived component at a concentration of 1 to 500 ppm.

Preferably, in the composite sheet material, an adhesive resin that forms the adhesive resin layer is a moisture-curable resin.

Preferably, the moisture-curable resin includes a polyurethane resin.

Preferably, the woven fabric shows a modulus of not less than 5 N/cm and not more than 40 N/cm at 10% deformation of a circular specimen in an arbitrary direction, and shows an elongation at break of not less than 25% in an arbitrary direction.

Preferably, the entangled fiber network comprises polyester fibers, in which the polyester contains a 1,2-propanediol-derived component at a concentration of 1 to 500 ppm.

A composite sheet material can be obtained having such excellent flexibility and high formability as well as such sufficient strength and durability that the composite sheet material can be used in vehicle interiors, furniture articles and the like. The composite sheet material is a composite sheet material that would lose less strength during thermoforming.

DETAILED DESCRIPTION

The composite sheet material is a composite sheet material comprising a skin sheet attached with a woven fabric through an adhesive resin layer, wherein the skin sheet is made of an entangled fiber network comprising ultra-fine fibers with an average single fiber diameter of 0.1 to 8 μm and an elastic polymer, which of course correspond to ultra-fine fibers, and wherein the woven fabric comprises polyester fibers, in which the polyester contains a 1,2-propanediol at a concentration of 1 to 500 ppm.

The types of ultra-fine fibers that can be used as a component of the entangled fiber network include, for example, natural fibers, recycled fibers, semi-synthetic fibers, and synthetic fibers. Among those, synthetic fibers are preferred from the viewpoint of durability, particularly mechanical strength, and of thermal resistance and light resistance; in particular, polyester fibers are preferably used.

Preferably, polyester fibers are used as the ultra-fine fibers to prepare a skin sheet, and the polyester in the polyester fibers contain a 1,2-propanediol-derived component at a concentration of 1 to 500 ppm to increase the thermal resistance and wear resistance of the skin sheet.

The concentration of a 1,2-propanediol-derived component in this context is determined by measuring the total amount of 1,2-propanediol detected in the polyester, which is decomposed and analyzed according to the method described in the Examples, wherein the above total amount is considered to be the total amount of 1,2-propanediol-derived structures copolymerized in polymer chains and 1,2-propanediol contained in the spaces between the polymer chains. That is, a portion of the 1,2-propanediol molecules may be copolymerized in the polyester main chain and the other may not be copolymerized but contained free. When the fibers contain any polymer other than polyester, a solvent such as 1,1,1,3,3,3-hexafluoro-2-propanol or ortho-chlorophenol is used for selective extraction of polyester, and is then distilled to obtain the concentration of a 1,2-propanediol-derived component by the method described in the Examples.

When synthetic fibers are used as the ultra-fine fibers, inorganic particles such as titanium oxide particles, and additives such as a lubricant, a pigment, a heat stabilizer, an ultraviolet absorber, a conducting agent, a heat storage agent, and antimicrobe agent can be added to a polymer that forms ultra-fine fibers, according to the purposes of the resulting composite sheet materials.

From the viewpoint of processing operation efficiency, each of the ultra-fine fibers preferably has a circular cross section, and may have an elliptic, flattened circular, or polygonal cross section such as a triangular cross section, or a deformed cross section such as a fan-shaped, cruciform, hollow, Y-shaped, T-shaped, or U-shaped cross section.

Importantly, the ultra-fine fibers have an average single fiber diameter of 0.1 to 8 μm. Ultra-fine fibers with an average single fiber diameter of not more than 8 μm will provide a skin sheet with premium surface effects including a dense and soft texture. On the other hand, ultra-fine fibers with an average single fiber diameter of not less than 0.1 μm will provide excellent effects to chromogenic properties after dyeing and/or to the robustness of products. The ultra-fine fibers preferably have an average single fiber diameter of not less than 1 μm and not more than 6 μm, more preferably not less than 1.5 μm and not more than 4.5 μm.

The average single fiber diameter is determined as follows. A scanning electron microscopy (SEM) image of a cross section of the sheet material is acquired, and 100 fibers with a circular or substantially circular cross section in the resulting image are randomly selected. Each of the selected fibers is measured for single fiber diameter, and the diameters of the 100 fibers are averaged to calculate the arithmetic mean, which is the average single fiber diameter. When ultra-fine fibers with a deformed cross section are used, the cross-sectional area of each single fiber is first measured, and the measured cross-sectional area is used to calculate the equivalent circle diameter, which is determined as a single filament diameter.

Preferably, the ultra-fine fibers form a non-woven fabric (sometimes also referred to as an ultra-fine fiber web) as the entangled fiber network, which is a component of the skin sheet. The non-woven fabric can provide a uniform and elegant appearance or texture when the surface is napped.

The non-woven fabric may take the form of a non-woven fabric made of either long fibers or short fibers. However, preferably, the non-woven fabric is a non-woven fabric made of short fibers because such a fabric has many fibers that can be raised and easily provides an elegant appearance.

The ultra-fine fibers preferably have a fiber length of 25 to 90 mm when those fibers are used to prepare a non-woven fabric made of short fibers. Ultra-fine fibers with a fiber length of not more than 90 mm will provide good characters and texture, while ultra-fine fibers with a fiber length of not less than 25 mm can provide a skin sheet with high wear resistance. The ultra-fine fibers more preferably have a fiber length of 35 to 80 mm, further preferably 40 to 70 mm.

The basis weight of the entangled fiber network, which is a component of the skin sheet, is preferably 50 to 400 g/m$^2$, further preferably 80 to 300 g/m$^2$. An entangled fiber network with a basis weight of less than 50 g/m$^2$ will provide a paper-like appearance and a poor texture to the resulting skin sheet. Moreover, an entangled fiber network with a basis weight of more than 400 g/m$^2$ tends to provide a hard texture to the resulting skin sheet.

In the skin sheet, the non-woven fabric and another woven fabric, which is different from a woven fabric attached to the skin sheet through an adhesive resin layer, may be laminated and integrated by fiber entanglement, for example, inside the skin sheet for the purpose of, for example, increasing strength, and the resultant laminate can be designated as an entangled fiber network, which is an aspect of a non-woven fabric attached with a woven fabric.

When the skin sheet comprises a woven fabric integrated with the non-woven fabric by fiber entanglement, the fibers that form the woven fabric include, for example, filament yarns, spun yarns, innovative spun yarns, and blended yarns of filament and spun yarns.

The basis weight of the woven fabric integrated with the non-woven fabric by fiber entanglement is preferably 20 to 200 g/m$^2$, further preferably 30 to 150 g/m$^2$. A woven fabric with a basis weight of less than 20 g/m$^2$ has poor shape stability, which leads to wrinkle formation in the woven fabric when the woven fabric is placed in between a non-woven fabric and another non-woven fabric, or when the woven fabric is overlaid on a non-woven fabric, which makes it difficult to evenly overlay the woven fabric. Moreover, a woven fabric with a basis weight of more than 200 g/m$^2$ tends to have a dense structure, which disturbs the integration of the woven fabric with a non-woven fabric by fiber entanglement.

Additionally, twill or satin weave may be used as the basic weave for the woven fabric integrated with the non-woven fabric by fiber entanglement, but plain weave is preferably used because plain weave produces fabrics with less misplacement of yarns. Furthermore, preferably, yarns that form the woven fabric are hard-twist yarns, and the twist number of the yarns that form the woven fabric is preferably 700 T/m to 4500 T/m.

The elastic polymer, which is a component of the skin sheet, is used as a binder to hold the ultra-fine fibers that form the skin sheet, and examples of the elastic polymer include polyurethane, SBR (styrene-butadiene rubber), NBR (nitrile rubber) and acrylic resins, in consideration of a flexible texture in the composite sheet material. Among those, polyurethane is preferably used as a main component. The use of polyurethane can provide a composite sheet material having a substantial texture, a leather-like appearance, and physical durability in practical use. Moreover, the main component in this context refers to the abundance of polyurethane, which is more than 50% by mass of the total elastic polymer.

When polyurethane is used, either a solvent-based polyurethane, which is dissolved in an organic solvent and then used, or a water-dispersible polyurethane, which is dispersed in water and then used, may be used. Moreover, a polyurethane obtained by the reaction among a polymer diol, an organic diisocyanate, and a chain extender is preferably used as the polyurethane.

Additionally, the elastic polymer may contain, depending on the purpose, various additives, including, for example, a pigment such as carbon black; a flame retardant such as a phosphorus-based, a halogen-based, or an inorganic flame retardant; an antioxidant such as a phenolic antioxidant, a sulfur antioxidant, or a phosphorus antioxidant; an ultraviolet absorber such as a benzotriazole ultraviolet absorber, a benzophenone ultraviolet absorber, a salicylate ultraviolet absorber, a cyanoacrylate ultraviolet absorber, or an oxalic acid anilide ultraviolet absorber; a light stabilizer such as a hindered amine light stabilizer or a benzoate light stabilizer; a hydrolysis stabilizer such as a polycarbodiimide compound; a plasticizer, an antistatic agent, a surfactant, a solidification modifier, and a dye.

The concentration of the elastic polymer in the skin sheet can be appropriately adjusted considering the type of the elastic polymer used, the production method for the elastic polymer, and the aesthetic and physical properties of the elastic polymer. The concentration of the elastic polymer is preferably not less than 10% by mass and not more than 60% by mass, more preferably not less than 15% by mass and not more than 45% by mass, further preferably not less than 20% by mass and not more than 40% by mass, of the skin sheet. The elastic polymer contained at a concentration of less than 10% by mass causes a weakened interaction between fibers mediated by the elastic polymer, which tends to reduce the wear resistance of the skin sheet. Moreover, the elastic polymer contained at a concentration of more than 60% by mass tends to provide a hard texture to the skin sheet.

The thickness of the skin sheet is measured by the method of JIS L1913 (2010) 6.1A, and is preferably 0.2 to 1.2 mm, more preferably 0.3 to 1.1 mm, further preferably 0.4 to 1 mm. A thickness of less than 0.2 mm causes a reduction in processing efficiency during manufacturing the skin sheet, while a thickness of more than 1.2 mm results in a tendency of the composite sheet material to lose flexibility.

Preferably, fibers are raised on a surface of the skin sheet, which is a component of the composite sheet material. When the surface is napped, the configuration of the raised fibers preferably includes raised fibers which are long and orientationally flexible enough to leave a trace, so-called fingermark, when the surface is brushed with a finger to change the orientation of the raised fibers, more specifically, raised fibers with a length of 10 µm to 300 µm, from the viewpoint of design-related effects.

The length of raised fibers on the surface is determined by acquiring a SEM image of a cross section of the composite sheet material with raised fibers at a magnification of 50×, measuring the heights of 10 raised fibers in a napped area (i.e., a layer comprising only ultra-fine fibers) in the image, and calculating the arithmetic mean.

Importantly, polyester fibers are a component contained in the woven fabric attached to the skin sheet, and the polyester in the polyester fibers further contains a 1,2-propanediolderived component at a concentration of 1 to 500 ppm. Polyester fibers are synthetic fibers with high thermal resistance. The thermal resistance is increased when the polyester in the polyester fibers further contain a 1,2-propanediol-derived component at a concentration of 1 to 500 ppm, preferably 5 to 300 ppm, further preferably 10 to 100 ppm. Consequently, such a woven fabric and a composite sheet material prepared using the woven fabric can be not only used for thermoforming at higher temperature, but also lose only a small amount of strength after thermoforming, which eventually allows the composite sheet material to retain high strength even after thermoforming.

The polyester in the polyester fibers that form the woven fabric is preferably a polymer that can be spun into fibers, and specific examples of the polyester include polyethylene terephthalate, polytrimethylene terephthalate, polytetramethylene terephthalate, polycyclohexylenedimethylene terephthalate, poly(ethylene-2,6-naphthalene dicarboxylate), and poly(ethylene-1,2-bis(2-chlorophenoxy)ethane-4,4'-dicarboxylate). Among those, polyethylene terephthalate, which is most widely used, and polyester copolymers containing ethylene terephthalate units are preferably used.

Examples of dicarboxylic acids and/or ester-forming derivatives thereof as the structural units of the polyester polymer include terephthalic acid, isophthalic acid, naphthalene dicarboxylic acids (for example, 2,6-naphthalenedicarboxylic acid), diphenyl carboxylic acids (for example, diphenyl-4,4'-dicarboxylic acid); aliphatic carboxylic acids such as oxalic acid, malonic acid, succinic acid, glutaric acid, adipic acid, pimelic acid, suberic acid, azelaic acid, sebacic acid, undecanedioic acid, and dodecanedioic acid; cycloaliphatic dicarboxylic acids such as cyclohexane dicarboxylic acids; 1,4-cyclohexane dicarboxylic acids; aromatic dicarboxylic acids and ester-forming derivatives thereof such as 5-sulfoisophthalate salts (such as lithium 5-sulfoisophthalate, potassium 5-sulfoisophthalate, and sodium 5-sulfoisophthalate) and the like.

The ester-forming derivatives refer to, for example, lower alkyl esters, acid anhydrides, and acyl chlorides of those dicarboxylic acids, and, for example, methyl esters, ethyl esters, and hydroxyethyl esters of those dicarboxylic acids are preferably used. A more preferred example of the dicarboxylic acids and/or ester-forming derivatives thereof is terephthalic acid and/or its dimethyl ester.

Additionally, terephthalic acid and/or its dimethyl ester derived from a biomass resource can be used as the terephthalic acid and/or its dimethyl ester.

Examples of a method by which terephthalic acid derived from a biomass resource is obtained include a method in which p-cymene is synthesized from cineol obtained from a plant of the genus *Eucalyptus* (see Nippon Kagaku Kaishi, (2), pp. 217-219; 1986), and then converted into p-methylbenzoic acid (see Organic Syntheses, 27; 1947) to obtain terephthalic acid. Furthermore, another example of the method is a method to obtain terephthalic acid by DielsAlder reaction of furandicarboxylic acid and ethylene (see WO 2009-064515). The thusobtained terephthalic acid from a biomass resource may further be converted into an ester-forming derivative for use.

Examples of diols as the structural units of the polyester polymer include diol compounds such as ethylene glycol, 1,3-propanediol, 1,4-butanediol, 1,5-pentanediol, 1,6-hexanediol, cyclohexanedimethanol, diethylene glycol, 2-methyl-1,3-propanediol, polyoxyalkylene glycols with a molecular weight of 500 to 20000 (such as polyethylene glycol), and ethylene oxide-modified bisphenol A. Among those, ethylene glycol is preferably used. Moreover, 1,2-propanediol can be used to achieve the concentration range. Furthermore, preferably, ethylene glycol derived from a biomass resource and purified to contain an adjusted concentration of 1,2-propanediol is used because ethylene glycol derived from biomass resources often contains 1,2-propanediol.

Examples of a method by which ethylene glycol derived from a biomass resource is obtained include a method in which biomass resources such as maize, sugarcane, wheat, and stems of crop plants are used to obtain ethylene glycol. Specifically, the method is as follows. These biomass resources are first converted into starch. The starch is converted into glucose with the help of water and enzymes, which glucose is then converted into sorbitol by hydrogenation. Further hydrogenation of the resulting sorbitol in the presence of a catalyst at a certain temperature and pressure produces a mixture of various glycols, from which ethylene glycol is purified.

The type of the woven fabric attached to the skin sheet can be selected depending on the design plan of the composite sheet material, from various knitted fabrics prepared based on, for example, warp knitting, weft knitting represented by tricot knitting, and lace knitting techniques; and from various woven fabrics prepared based on, for example, plain weaving, twill weaving, and satin weaving techniques. A more flexible woven fabric is preferably used.

The woven fabric attached to the skin sheet preferably shows a modulus of not less than 5 N/cm and not more than 40 N/cm at 10% deformation of a circular specimen in an arbitrary direction. The modulus of the circular specimen deformed by 10% is related to the followability of the composite sheet material, which is demonstrated when the composite sheet material is fit to a curved surface. When the modulus of the circular specimen deformed by 10% in an arbitrary direction is less than 5 N/cm, the woven fabric is easily relaxed and forms wrinkles. Moreover, when the modulus is more than 40 N/cm, the woven fabric tends to be distorted, which leads to a reduced adhesiveness. Because the force applied to the sheet during a forming process is from all directions, the woven fabric preferably shows the above-described modulus at 10% deformation of a circular specimen in an arbitrary direction.

The arbitrary direction in this context refers to randomly selected four directions to measure the modulus of the woven fabric, in all of which the woven fabric shows measured modulus values within the above-described range. Moreover, the woven fabric preferably shows values within the above-described range at four directions separated by 45 degrees, that is, directions with 0, 45, 90, and 135 degrees of separation from a reference line. When there is a possibility of a wide range of variation in values measured at those angles, the measurement is repeated three or more times at each angle and the arithmetic mean of the measured values is determined as the value at that angle.

Additionally, the woven fabric attached to the skin sheet preferably shows an elongation at break of not less than 25% in an arbitrary direction, more preferably not less than 35%, further preferably not less than 45%. A woven fabric with an elongation at break of less than 25% may be fractured at a curved portion during a forming process. Moreover, a woven fabric with an excessively high elongation at break is easily extended and tends to have poor shape stability. Thus, the woven fabric preferably has an elongation at break of less than 100%. The arbitrary direction in this context is as described above. Moreover, the woven fabric preferably shows values within the above-described range at four directions separated by 45 degrees, namely directions with 0, 45, 90, and 135 degrees of separation from a reference line. When there is a possibility of a wide range of variation in values measured at those angles, the measurement is repeated three or more times at each angle and the arithmetic mean of the measured values is determined as the value at that angle.

The thickness of the above-described woven fabric preferably is 0.1 to 1 mm, more preferably 0.15 to 0.8 mm, further preferably 0.2 to 0.7 mm. A woven fabric with a thickness of less than 0.1 mm causes lower processing efficiency in attachment to the skin sheet, while a woven fabric with a thickness of more than 1 mm tends to impair the flexibility of the composite sheet material.

Importantly, the skin sheet is attached with the woven fabric through the adhesive resin layer in the composite sheet material.

The adhesive resin layer serves as an adhesive to bond the skin sheet to the woven fabric, and examples of an adhesive resin that forms the adhesive resin layer include thermoplastic resins such as polyester resins, polyester copolymer resins, nylon resins, and acrylic resins; and moisture-curable resins such as silicone rubbers, polystyrene rubbers, and polyurethane resins. Among those, moisture-curable resins are more preferred because moisturecurable resins have high thermal resistance and do not impair the appearance of the skin sheet when attached thereto; among those moisture-curable resins, polyurethane resins with excellent adhesiveness are preferably used. Examples of the moisture-curable polyurethane resin include Hi-Bon YA-180-1 (manufactured by Hitachi Chemical Co., Ltd.).

The adhesive resin layer can take any of various forms that allow attachment of the skin sheet to the woven fabric, including sheet forms, mesh forms, and dotted forms, and an adhesive resin layer in a dotted form will provide a flexible texture to the composite sheet material.

When the adhesive resin layer takes a dotted form, the diameter of dots preferably is 10 µm to 1000 µm and the number of dots per $cm^2$ is preferably is 10 to 200 to allow the adhesive resin layer not to impair the flexible texture of the resulting sheet material but to have sufficient adhesive strength.

The thickness of the adhesive resin layer is within the range that provides the adhesive resin layer with sufficient attaching property and does not impair the flexible texture of the composite sheet material, preferably is 1 to 100 µm.

A resin containing a flame retardant may be applied as appropriate to the composite sheet material, depending on the application of the composite sheet material.

When a resin containing a flame retardant is applied, the resin is selected from, for example, acrylic resins, urethane resins, polyester resins, and vinyl acetate resins, and an acrylic resin is particularly preferably used from the viewpoint of the thermal resistance and the adhesiveness to the composite sheet material.

When a resin containing a flame retardant is used, a phosphorus-based flame retardant and/or an inorganic flame retardant are preferably used as the flame retardant, which will produce no harmful substance when burned.

As the phosphorus-based flame retardant, polyphosphate-based flame retardants such as ammonium polyphosphate (for example, Exflam APP204, manufactured by Wellchem Industry Co., Ltd., and Exolit AP462, manufactured by Clariant AG), nitrogen-containing organic phosphate-based flame retardants such as guanidine phosphate (for example, Vigol No. 415, manufactured by Daikyo Chemical Co., Ltd.), and aromatic phosphate ester-based flame retardants such as a triphenyl phosphate or trixylenyl phosphate (for example, TPP, manufactured by Daihachi Kogyo Co., Ltd.) can be used. As the inorganic flame retardant, known flame retardants such as aluminium hydroxide, titanium oxide, zinc oxide, expanded graphite, magnesium hydroxide, calcium carbonate, zinc borate, ammonium polyphosphate, and red phosphorus, can be used. Among those, a polyphosphate-based flame retardant with high processing efficiency and durability is preferably used.

The above-described resin containing a flame retardant may further contain, for example, aluminium hydroxide, magnesium hydroxide, or a metal oxide as a flame retardant promoter, in addition to the flame retardant component as described above.

Furthermore, a thickener, liquid paraffin, and a softening agent such as polyethylene glycol can be added to the above-described resin containing a flame retardant, for the purpose of improving the temporal stability and the production operability.

As the above-described thickener, for example, polyvinyl alcohol, methyl cellulose, carboxymethyl cellulose, an alkali-thickening acrylic resin, or an ethylene oxide-modified higher fatty acid ester can be used at any concentration within the range that causes no adverse effect on the water stain resistance of the composite sheet material.

The method of applying the resin containing a flame retardant can be appropriately determined according to intended use and required properties, and selected from, for example, application by impregnation of the skin sheet only, application by impregnation of the composite sheet material, and application by coating the back surface of the skin sheet or the composite sheet material.

The application amount of the resin containing a flame retardant is an amount within the range that allows the composite sheet material not to have an impaired flexible texture, but to exert good flame resistance. The resin containing a flame retardant is preferably applied at 5 to 25% by mass, more preferably 10 to 20% by mass, of the composite sheet material (in solid content) on the dry mass basis.

The composite sheet material characteristically loses only a small amount of strength even after thermoforming. Because it is difficult to actually measure the amount of strength reduction in the composite sheet material by itself after thermoforming, the theoretical amount of strength reduction in the composite sheet material after thermoforming was determined as follows.

According to the method H-1 (dry heating-and-pressing test) described in JIS L 1096 (2010) 8.39 (c) (for dimensional change during pressing and finishing), each test piece (from the composite sheet material) was placed on a pressing machine, with the surface facing down, and then pressed at a constant pressure of 20 kPa for 20 seconds by the upper ironing plate of the pressing machine heated at 140° C. Subsequently, the test piece was measured for tensile strength to calculate the amount of strength reduction after heat pressing by using the following formula, and the obtained value was evaluated as the amount of strength reduction after thermoforming:

The amount of strength reduction in a composite sheet material after heat pressing (%)=100×[{the tensile strength of the composite sheet material before heat pressing (N/cm)}−{the tensile strength of the composite sheet material after heat pressing (N/cm)}]/{the tensile strength of the composite sheet material before heat pressing (N/cm)}.

An amount of strength reduction of not more than 5% in a composite sheet material after heat pressing means that only a small amount of strength is lost in the composite sheet material after thermoforming, and that the composite sheet material retains sufficient strength even after thermoforming.

Additionally, the sheet material preferably reduces a weight of not more than 10 mg, more preferably not more than 8 mg, further preferably not more than 6 mg, after 20000 times of abrasion in a wear resistance test performed according to a method described in JIS L 1096E (2010) 8.19.5E (Martindale test). When the reduction in weight is not more than 10 mg, the sheet material can be prevented from producing lint, which pollutes the environment, when practically used.

Next, a method of producing the composite sheet material will be described by way of examples.

A preferred method of obtaining ultra-fine fibers as a component of a skin sheet is to use precursor fibers for ultra-fine fibers. In the method, precursor fibers for ultra-fine fibers are entangled with each other to form a non-woven fabric in advance, and then treated to prepare ultra-fine fibers, whereby a non-woven fabric composed of entangled bundles of ultra-fine fibers can easily be obtained.

As the precursor fibers for ultra-fine fibers, for example, sea-island or split-type conjugate fibers can be used, the former of which is composed of two different thermoplastic resins with different solvent solubilities as a sea component and an island component, from which ultra-fine fibers consisting of the island component are produced by using, for example, a solvent to dissolve and remove the sea component, and the latter of which is composed of two different thermoplastic resins alternately arranged to allow each fiber to have a radial or multilayer cross-sectional pattern, which facilitates splitting split-type conjugate fibers into ultrafine fibers composed of either of the thermoplastic resins.

Among those, sea-island conjugate fibers are preferably used from the viewpoint of providing an excellent texture and a good surface to the sheet material because suitable gaps can be created between fibers composed of the island component, that is, between ultra-fine fibers in fiber bundles, by removing the sea component.

Sea-island conjugate fibers can be manufactured using different techniques: for example, a technique using mutual arrays of polymers which are produced using a spinneret in an island-in-the-fiber configuration to spin and combine fibers composed of two polymer components, that is, sea and island components, arranged side-by-side, and a blend-spinning technique in which two polymer components, that is, sea and island components, are mixed in advance of the spinning process. Among those, sea-island conjugate fibers manufactured using the technique using mutual arrays of polymers are preferably used from the viewpoint that ultra-fine fibers with a homogeneous single fiber fineness are provided by this technique.

Further, a non-woven fabric made of either short fibers or long fibers may be used as the non-woven fabric, as described above. However, use of a non-woven fabric made of short fibers can increase the number of fibers oriented in the thickness direction of the sheet material and provide a denser appearance to the sheet material when the surface is napped, as compared to use of a non-woven fabric made of long fibers.

When a non-woven fabric made of short fibers is used as the non-woven fabric, the obtained precursor fibers for ultra-fine fibers are preferably textured and cut to a predetermined length to obtain stock fibers. Any known methods can be used for the texturizing and cutting processes.

Next, the obtained stock fibers are put together in a web form, and intertwined with each other on, for example, a crosslapper to produce a non-woven fabric, a kind of entangled fiber network. For example, needle punching or water-jet punching can be used as a method for intertwining the web of fibers with each other to produce a non-woven fabric.

As described above, a non-woven fabric and a woven fabric can be integrated together by fiber entanglement to form an entangled fiber network. In this respect, a method of integrating these fabrics together by, for example, needle punching or water-jet punching is preferably used.

Needles used for needle punching preferably have one to nine barbs. Use of needles preferably having one or more barbs enables efficient entanglement of fibers. Use of needles preferably having nine or less barbs, on the other hand, achieves reduction of damage to fibers.

The number of conjugate fibers such as precursor fibers for ultra-fine fibers, caught by needle barbs is dependent on the shape of the barbs and the diameter of the conjugate fibers. Therefore, in the needles preferably used in the needle punching process, the shape of each barb has a kick-up of 0 to 50 μm, an undercut angle of 0 to 40°, a throat depth of 40 to 80 μm, and a throat length of 0.5 to 1.0 mm.

Additionally, the number of needles is preferably 1000 to 8000 needles/cm$^2$. When the number of needles is preferably not less than 1000 needles/cm$^2$, a dense texture and a fine finish can be achieved. On the other hand, when the number of needles is preferably not more than 8000 needles/cm$^2$, reduction in processing efficiency, damage to fibers, and drop of strength can be prevented.

Furthermore, when a woven fabric and a non-woven fabric composed of precursor fibers for ultra-fine fibers are integrated together by fiber entanglement, barbs of needles for needle punching are preferably oriented in a direction at an angle of 90±25° to the moving direction of the woven and non-woven fabrics, to reduce the frequency of catching vulnerable weft threads with the needles.

Additionally, a series of columnar water jets is preferably produced in a water-jet punching process. Specifically, water is preferably ejected at a pressure of 1 to 60 MPa through a nozzle with a hole diameter of 0.05 to 1.0 mm.

A non-woven fabric which is composed of conjugate fibers (i.e., precursor fibers for ultra-fine fibers) and has undergone a needle punching or water-jet punching process preferably has an apparent density of 0.15 to 0.45 g/cm$^3$. A non-woven fabric preferably having an apparent density of not less than 0.15 g/cm$^3$ can provide sufficient shape stability and dimensional stability to artificial leather materials. On the other hand, a non-woven fabric preferably having an apparent density of not more than 0.45 g/cm$^3$ can provide enough void space for elastic polymer application.

Preferably, the non-woven fabric may be treated with hot water or steam for thermal shrinkage to enhance the dense appearance of the fibers.

Then, the non-woven fabric may be impregnated with an aqueous solution of a watersoluble resin and then dried to apply the water-soluble resin to the non-woven fabric. The watersoluble resin applied to the non-woven fabric serves to secure fibers in place, which results in increased dimensional stability.

Subsequently, the obtained non-woven fabric is treated with a solvent to prepare ultra-fine fibers with an average single fiber diameter of 0.1 to 8 μm.

The ultra-fine fibers can be prepared by immersing the non-woven fabric, which is composed of sea-island conjugate fibers, in a solvent to dissolve and remove the sea component.

When the sea component in the sea-island conjugate fibers used as precursor fibers for ultra-fine fibers is polyethylene, polypropylene, or polystyrene, an organic solvent such as toluene or trichloroethylene can be used as a solvent to dissolve and remove the sea component. Moreover, when the sea component is a polyester copolymer or polylactic acid, an aqueous alkali solution such as an aqueous sodium hydroxide solution, can be used. Moreover, when the sea component is a water-soluble thermoplastic polyvinyl alcohol resin, hot water can be used.

Next, an elastic polymer in a solution or dispersion is impregnated into the nonwoven fabric (i.e., the entangled fiber network) and then solidified to apply the elastic polymer to the non-woven fabric. Methods for fixation of an elastic polymer to the non-woven fabric include methods in which an elastic polymer in a solution or dispersion is impregnated into the sheet (i.e., the non-woven fabric) and then solidified under wet or dry conditions, from which the fixation method can be appropriately selected depending on the type of the elastic polymer used.

The sheet material carrying the applied elastic polymer is preferably cut (or sliced) into halves by a plane through half the thickness, from the viewpoint of production efficiency.

The surface of the sheet material carrying the applied elastic polymer or the surface of the halved sheet material can be napped. The napping process can be performed by, for example, an abrasion method using sandpaper or a sander.

When the surface is napped, a lubricant such as a silicone emulsion can be applied prior to the napping process. Moreover, an antistatic agent is preferably applied prior to the napping process to reduce accumulation of powder on the sandpaper, which powder is created by grinding the sheet material. Thus, a skin sheet is created.

The above-described skin sheet can be dyed as necessary. Examples of a dyeing process that can be used as the above dyeing include dip dyeing processes such as an overflow dyeing process in which a jigger dyeing machine or an overflow dyeing machine is used, and a thermosol dyeing process in which a continuous dyeing machine is used; and printing processes on the napped surface by, for example, roller printing, screen printing, inkjet printing, sublimation printing, or vacuum sublimation printing. Among those, use of an overflow dyeing machine is preferred in the aspect of the quality and appearance in the resulting products such as flexibility. Moreover, various resin finishing process may be applied as necessary after dyeing.

Additionally, a design can be applied to the surface of the above-described skin sheet, as necessary. For example, post-manufacturing processes such as a hole forming process like perforation, an embossing process, a laser ablation process, a pinsonic process, and a printing process, can be applied. Any post-manufacturing process may be applied to a simple skin sheet or to a skin sheet attached with a woven fabric, that is, a composite sheet material.

Next, the skin sheet and the woven fabric are attached with each other using the adhesive resin. In methods of applying the adhesive resin, a predetermined amount of the adhesive resin can be applied using an apparatus such as a rotary screen, a knife-over-roll coater, a gravure roll coater, a kiss-roll coater, or a calendar coater. Among those, an adhesive resin layer in a dotted form is preferably formed using a rotary screen or a gravure roll coater to provide an good texture to the resulting composite sheet material.

Any known bonding method can be appropriately selected and used depending on the type of an adhesive resin used, to perform bonding.

The composite sheet material can be used as a composite sheet material with high flexibility and formability as well as high strength in a variety of fields such as for vehicle interiors, furniture and interior materials, and building materials, and is preferably used as a seat cover material, one of the vehicle interior materials in which especially high strength is required.

EXAMPLES

Next, the composite sheet material will be more specifically described by way of examples. However, this disclosure should not be construed to be limited by those examples. Evaluation Method
(1) Average Single Fiber Diameter:

The average single fiber diameter was determined as follows. A scanning electron microscopy (SEM) image of a cross section of a skin sheet was acquired, and 100 fibers with a circular or substantially circular cross section in the resulting image were randomly selected. Each of the selected fibers was measured for single fiber diameter, and the diameters of the 100 fibers were averaged to calculate the arithmetic mean, which is the average single fiber diameter. When ultra-fine fibers with a deformed cross section were used, the cross-sectional area of each single fiber was first measured, and the measured cross-sectional area was used to calculate the equivalent circle diameter, which was determined as a single filament diameter.

(2) Content of 1,2-Propanediol-Derived Component in Polyester:

An aqueous solution of 1,2-butanediol at a concentration of 1000 μg/ml was first prepared, and designated as an internal standard solution A. Into an accurately weighed 0.1 g of sample in a vial, 0.015 ml of the internal standard solution A and 1 ml of ammonia water were added, and the vial was capped to heat the resulting sample at 150° C. for 3 hours, and then left to cool down to room temperature (25° C.). Subsequently, 2 ml of methanol and 2.0 g of terephthalic acid were added to the vial, and the resulting vial was shaken for 15 minutes and then centrifuged at 4000 G for 3 minutes. The supernatant was transferred for analysis on a gas chromategraph (Hewlett Packard 5890 Series II; injection port: a split/splitless injection port; detector: a hydrogen-flame ionization detector) under the following conditions to measure the concentration of a 1,2-propanediol-derived component with the aid of a standard curve as described below:

Injector temperature: 220° C.,
Column head pressure: 20 psi,
Carrier gas: helium,
Sample injection method: split injection (at 25 ml/min of flow rate),
Septum purge: helium at 3.0 ml/min,
Sample injection volume: 1.0 μl,
Detector temperature: 220° C.,
Gas flow rate: hydrogen, 40 ml/min; air, 400 ml/min; nitrogen, 40 ml/min,
Initial oven temperature: 60° C. (with 2 minutes of retention time),
Final oven temperature: 220° C. (with 2 minutes of retention time),
Oven heating rate: 20° C./min (a linear ramp).

The standard curve of 1,2-propanediol was generated as follows. An aqueous solution of 1,2-propanediol at a concentration of 1000 μg/ml was prepared and designated as a standard mother liquid B. Then, the internal standard solution A with a volume of 0.025 ml and the standard mother liquid B with a volume varying between 0.003 to 0.08 ml were placed in a measuring flask with a volume of 5 ml, and a mixture solvent (methanol:purified water=2:1; containing ethylene glycol at a concentration of 1.1%) was further added thereto to prepare seven different standard solutions C with a constant volume. The added volumes of the standard mother liquid B are selected to provide 1,2-propanediol at sufficient concentrations for the measurement on samples. The prepared standard solutions C were independently subjected to gas chromatography under the above-described conditions, and the peak ratio values obtained between 1,2-propanediol and the internal standard were plotted against the concentration ratio values between 1,2-propanediol and the internal standard in the standard solutions C to generate a standard curve of 1,2-propanediol.

(3) Inherent Viscosity (IV) of Polymer:

In ortho-chlorophenol (hereinafter sometimes referred to as OCP) with a volume of 10 mL, 0.8 g of a sample polymer was dissolved, and the relative viscosity $\eta_r$ of the resulting solution was measured using an Ostwald viscometer at 25° C. to calculate the inherent viscosity IV from the following equations:

$$\eta_r = \eta/\eta_o = (t \times d)/(t_o \times d_o);$$

Inherent viscosity $IV = 0.0242\eta_r + 0.2634$ wherein $\eta$ represents the viscosity of a polymer solution; $\eta_o$ represents the viscosity of OCP; t represents the traveling time of a solution (sec); d represents the density of the solution (g/cm³); $t_o$ represents the traveling time of OCP (sec); and $d_o$ represents the density of OCP (g/cm³).

(4) Modulus of Circular Woven Fabric Specimen at 10% Deformation:

After a woven fabric was carefully peeled off from a composite sheet material, circular test pieces with a diameter of 300 mm were cut out from the woven fabric. A pair of gauge marks 200 mm apart, which represents one direction, were marked at the center of each test piece, and the modulus of each test piece was measured at 10% deformation on an Instron tensile tester with a gauge length of 200 mm and a test speed of 200 mm/min. The measurement was performed on four test pieces by pulling the test pieces in the directions with 0, 45, 90, and 135 degrees of separation from an arbitrarily drawn reference line to perform the measurement in each direction, and the result was expressed as a range from the minimum to the maximum.

(5) Elongation at Break of Woven Fabric:

After a woven fabric was carefully peeled off from a composite sheet material, test pieces with a width of 25 mm and a length of 200 mm were cut out from the woven fabric. Each test piece was pulled on an Instron tensile tester with a gauge length of 100 mm and a test speed of 200 mm/min, according to a method described in JIS L 1096 (2010) 8.14.1 A (Constant-rate-of-extension tensile test), and the elongation rate recorded at the moment of break was determined as the elongation at break. The measurement was performed on four test pieces by pulling the test pieces in the directions with 0, 45, 90, and 135 degrees of separation from an arbitrarily drawn reference line to perform the measurement in each direction, and the result was expressed as a range from the minimum to the maximum.

(6) Reduction in Strength of Composite Sheet Material after Heat Pressing:

According to the method H-1 (dry heating-and-pressing test) described in JIS L 1096 (2010) 8.39 (c) (for dimensional change during pressing and finishing), each test piece (from the composite sheet material) was placed on a pressing machine, with the surface facing down, and then pressed at a constant pressure of 20 kPa for 20 seconds by the upper ironing plate of the pressing machine heated at 180° C. Subsequently, the test piece was measured for tensile strength to calculate the amount of strength reduction after heat pressing by using the following formula, and the obtained value was evaluated as the amount of strength reduction after thermoforming:

> The amount of strength reduction in a composite sheet material after heat pressing (%)=100× [{the tensile strength of the composite sheet material before heat pressing (N/cm)}−{the tensile strength of the composite sheet material after heat pressing (N/cm)}]/{the tensile strength of the composite sheet material before heat pressing (N/cm)}.

(7) Wear Resistance of Composite Sheet Material:

Weight loss (abrasion weight loss) in a sheet material was measured after 20000 times of abrasion in a wear resistance test performed according to a method described in JIS L 1096E (2005) (Martindale test) with load application to furniture articles (at 12 kPa), and a weight loss of not more than 10 mg was evaluated as acceptable. A weight loss of not more than 5 mg can be evaluated as excellent.

Abbreviations for Chemicals

The following abbreviations are used:
DMF: N,N-dimethylformamide,
PET: polyethylene terephthalate,
PVA: polyvinyl alcohol.

Production of Skin sheet A

A polyethylene terephthalate (PET) polymer containing 1,2-propanediol at a concentration of 15 ppm and having an inherent viscosity (IV) of 0.718 as an island component and a polystyrene polymer with an MFR of 18 as a sea component were used at an island component/sea component mass ratio of 55/45 for melt spinning using a 16-island/hole spinneret in an island-in-the-sea configuration at a spinning temperature of 285° C., and then drawn and textured on a draw-texturizing machine, and the resulting filament was then cut into 51 mm long pieces to obtain stock fibers consisting of sea-island conjugate fibers with a single fiber fineness of 3.0 dtex.

The stock fibers obtained as described above were used to form a web of loosely held fibers through carding and crosslapping processes, and the resultant web was subjected to needle punching at a punching density of 2400 needles/cm' to obtain a sheet of entangled fibers (felt) with a thickness of 2.9 mm and a density of 0.21 g/cm$^3$.

The sheet of entangled fibers obtained as described above was treated with hot water at 96° C. to induce shrinkage, and impregnated with an aqueous solution of PVA with a saponification degree of 88% and a concentration of 12% by mass, and the resulting sheet was wrung to leave a targeted 30% by mass of the solution relative to the solid fibers, and then dried by hot air at 140° C. for 10 minutes with allowing migration of PVA, to obtain a PVA-attached sheet. Next, the thus-obtained PVA-attached sheet was immersed in trichloroethylene, and repeatedly wrung and pressed 10 times using a mangle to dissolve and remove the sea component and to compress the PVA-attached sheet to obtain a sea-removed PVA-attached sheet as an PVA-attached entangled bundles of ultra-fine fibers.

The sea-removed and PVA-attached compressed sheet obtained as described above was immersed in a solution of polycarbonate-based polyurethane in DMF adjusted to a solid content of 13% by mass, and the resulting sheet was wrung to leave a targeted 30% by mass of the solution relative to the solid fibers, and then applied to solidification of polyurethane in an aqueous solution of DMF at a concentration of 30% by mass. Subsequently, the resulting sheet was treated with hot water to remove PVA and DMF, and then dried by hot air at 120° C. for 10 minutes to obtain a polyurethane-attached sheet with a thickness of 1.7 mm.

The polyurethane-attached sheet obtained as described above was cut into halves by a plane through half the thickness, and then buffed with a sandpaper belt to obtain a napped sheet with a thickness of 0.46 mm.

The napped sheet obtained as described above was dyed in black by using an overflow dyeing machine at 120° C., and dried using a dryer to obtain the skin sheet A as a skin sheet comprising ultra-fine fibers with an average single fiber diameter of 3.1 μm and having a basis weight of 170 g/m$^2$ and a thickness of 0.5 mm.

Production of Skin Sheet B

A polyethylene terephthalate (PET) polymer containing 1,2-propanediol at a concentration of 15 ppm and having an inherent viscosity (IV) of 0.718 as an island component and a polystyrene polymer with an MFR of 2.2 as a sea component were used at an island component/sea component mass ratio of 80/20 for melt spinning using a 16-island/hole spinneret in an island-in-the-sea configuration at a spinning temperature of 285° C., and then drawn and textured on a draw-texturizing machine, and the resulting filament was then cut into 51 mm long pieces to obtain stock fibers consisting of sea-island conjugate fibers with a single fiber fineness of 4.2 dtex. The skin sheet B was obtained as a skin sheet comprising ultra-fine fibers with an average single fiber diameter or 4.4 μm and having a basis weight of 170 g/m$^2$ and a thickness of 0.5 mm by the same method as in the production of the skin sheet A, except that the above stock fibers were used instead.

Production of Skin Sheet C

A polyethylene terephthalate (PET) polymer containing 1,2-propanediol at a concentration of 15 ppm and having an inherent viscosity (IV) of 0.718 as an island component and a polystyrene polymer with an MFR of 18 as a sea component were used at an island component/sea component mass ratio of 55/45 for melt spinning using a 36-island/hole spinneret in an island-in-the-sea configuration at a spinning temperature of 285° C., and then drawn and textured on a draw-texturizing machine, and the resulting filament was then cut into 51 mm long pieces to obtain stock fibers consisting of sea-island conjugate fibers with a single fiber fineness of 2.8 dtex. The skin sheet C was obtained as a skin sheet comprising ultra-fine fibers with an average single fiber diameter or 2.0 μm and having a basis weight of 170 g/m$^2$ and a thickness of 0.5 mm by the same method as in the production of the skin sheet A, except that the above stock fibers were used instead.

Production of Skin Sheet D

A polyethylene terephthalate (PET) polymer containing 1,2-propanediol at a concentration of 15 ppm and having an inherent viscosity (IV) of 0.718 as an island component and a polystyrene polymer with an MFR of 2.2 as a sea component were used at an island component/sea component mass ratio of 90/10 for melt spinning using a 16-island/hole spinneret in an island-in-the-sea configuration at a spinning temperature of 285° C., and then drawn and textured on a draw-texturizing machine, and the resulting filament was then cut into 51 mm long pieces to obtain stock fibers consisting of sea-island conjugate fibers with a single fiber fineness of 5.9 dtex. The skin sheet D was obtained as a skin sheet comprising ultra-fine fibers with an average single fiber diameter or 5.5 μm and having a basis weight of 170 g/m$^2$ and a thickness of 0.5 mm by the same method as in the production of the skin sheet A, except that the above stock fibers were used instead.

Production of Skin Sheet E

A polyethylene terephthalate (PET) polymer containing 1,2-propanediol at a concentration of 15 ppm and having an inherent viscosity (IV) of 0.718 as an island component and a polystyrene polymer with an MFR of 18 as a sea component were used at an island component/sea component mass ratio of 20/80 for melt spinning using a 36-island/hole spinneret in an island-in-the-sea configuration at a spinning temperature of 285° C., and then drawn and textured on a draw-texturizing machine, and the resulting filament was then cut into 51 mm long pieces to obtain stock fibers consisting of sea-island conjugate fibers with a single fiber fineness of 1.6 dtex. The skin sheet E was obtained as a skin sheet comprising ultra-fine fibers with an average single fiber diameter or 0.9 μm and having a basis weight of 170 g/m² and a thickness of 0.5 mm by the same method as in the production of the skin sheet A, except that the above stock fibers were used instead.

Production of Skin Sheet F

A polyethylene terephthalate (PET) polymer containing no 1,2-propanediol-derived component and having an inherent viscosity (IV) of 0.718 as an island component and a polystyrene polymer with an MFR of 18 as a sea component were used at an island component/sea component mass ratio of 55/45 for melt spinning using a 16-island/hole spinneret in an island-in-the-sea configuration at a spinning temperature of 285° C., and then drawn and textured on a draw-texturizing machine, and the resulting filament was then cut into 51 mm long pieces to obtain stock fibers consisting of sea-island conjugate fibers with a single fiber fineness of 3.0 dtex. The skin sheet G was obtained as a skin sheet comprising ultra-fine fibers with an average single fiber diameter or 3.1 μm and having a basis weight of 170 g/m² and a thickness of 0.5 mm by the same method as in the production of the skin sheet A, except that the above stock fibers were used instead.

Production of Skin Sheet G

A polyethylene terephthalate (PET) polymer containing 1,2-propanediol at a concentration of 15 ppm and having an inherent viscosity (IV) of 0.718 as an island component and a polystyrene polymer with an MFR of 18 as a sea component were used at an island component/sea component mass ratio of 55/45 for melt spinning using a 16-island/hole spinneret in an island-in-the-sea configuration at a spinning temperature of 285° C., and then drawn and textured on a draw-texturizing machine, and the resulting filament was then cut into 51 mm long pieces to obtain stock fibers consisting of sea-island conjugate fibers with a single fiber fineness of 3.0 dtex.

The stock fibers obtained as described above were used to form a web of loosely held fibers through carding and crosslapping processes. Additionally, a plain weave fabric with a warp weave density of 97 yarns/2.54 cm and a weft weave density of 76 yarns/2.54 cm was produced using a multifilament yarn made of a single component with an inherent viscosity (IV) of 0.65 and having a twist number of 2500 T/m (84 dtex; consisting of 72 filaments) as both warp and weft, and the plain weave fabric was laminated to the both surfaces of the web of loosely held fibers. Then, the resultant laminate was subjected to needle punching at a punching density of 2400 needles/cm² to obtain a sheet of entangled fibers (felt) with a thickness of 3.4 mm and a density of 0.22 g/cm³. The sheet of entangled fibers obtained as described above was treated with hot water at 96° C. to induce shrinkage, and impregnated with an aqueous solution of PVA with a saponification degree of 88% and a concentration of 5% by mass, and the resulting sheet was wrung to leave a targeted 7.5% by mass of the solution relative to the solid fibers, and then dried by hot air at 140° C. for 10 minutes with allowing migration of PVA, to obtain a PVA-attached sheet. Next, the thus-obtained PVA-attached sheet was immersed in trichloroethylene, and repeatedly wrung and pressed 10 times using a mangle to dissolve and remove the sea component and to compress the PVA-attached sheet, to obtain a sea-removed PVA-attached sheet as an PVA-attached entangled bundles of ultra-fine fibers.

The sea-removed and PVA-attached compressed sheet obtained as described above was immersed in a solution of polycarbonate-based polyurethane in DMF adjusted to a solid content of 11.3% by mass, and the resulting sheet was wrung to leave a targeted 26% by mass of the solution relative to the solid fibers, and then applied to solidification of polyurethane in an aqueous solution of DMF at a concentration of 30% by mass. Subsequently, the resulting sheet was treated with hot water to remove PVA and DMF, and then dried by hot air at 120° C. for 10 minutes to obtain a polyurethane-attached sheet with a thickness of 1.6 mm.

The polyurethane-attached sheet obtained as described above was cut into halves by a plane through half the thickness, and then buffed with a sandpaper belt to obtain a napped sheet with a thickness of 0.55 mm.

The napped sheet obtained as described above was dyed in black by using an overflow dyeing machine at 120° C., and dried using a dryer to obtain the skin sheet G as a skin sheet comprising ultra-fine fibers with an average single fiber diameter of 3.1 μm and having a basis weight of 250 g/m² and a thickness of 0.6 mm.

Production of Woven Fabric A

Polyethylene terephthalate (PET) fibers were spun from a PET polymer containing a 1,2-propanediol-derived component at a concentration of 15 ppm and having an inherent viscosity (IV) of 0.68, and drawn, and then used to obtain a composite yarn with 110 dtex consisting of 48 filaments. After provisionally texturizing the composite yarn, a satin weave fabric was obtained using the textured composite yarn and a 28-gauge tricot machine, and the obtained satin weave fabric was treated with hot water at 120° C. to induce shrinkage using an overflow dyeing machine, and a woven fabric with a thickness of 0.64 mm and a basis weight of 210 g/m² was consequently obtained. The woven fabric showed a modulus of a circular specimen deformed by 10% in an arbitrary direction within the range from 15 to 31 N/cm and an elongation at break in an arbitrary direction from 50 to 64%.

Production of Woven Fabric B

A woven fabric with a thickness of 0.64 mm and a basis weight of 210 g/m² was obtained by the same production method as for the woven fabric A, except that the concentration of a 1,2-propanediol-derived component in the PET polymer was 72 ppm. The woven fabric showed a modulus of a circular specimen deformed by 10% in an arbitrary direction within the range from 16 to 31 N/cm and an elongation at break in an arbitrary direction within the range from 51 to 63%.

Production of Woven Fabric C

A woven fabric with a thickness of 0.64 mm and a basis weight of 210 g/m² was obtained by the same production method as for the woven fabric A, except that the concentration of a 1,2-propanediol-derived component in the PET polymer was 195 ppm. The woven fabric showed a modulus of a circular specimen deformed by 10% in an arbitrary direction within the range from 14 to 30 N/cm and an elongation at break in an arbitrary direction within the range from 49 to 65%.

Production of Woven Fabric D

A woven fabric with a thickness of 0.64 mm and a basis weight of 210 g/m² was obtained by the same production method as for the woven fabric A, except that the concentration of a 1,2-propanediol-derived component in the PET polymer was 7 ppm. The woven fabric showed a modulus of a circular specimen deformed by 10% in an arbitrary direction within the range from 17 to 32 N/cm and an elongation at break in an arbitrary direction within the range from 48 to 59%.

Production of Woven Fabric E

A woven fabric with a thickness of 0.64 mm and a basis weight of 210 g/m² was obtained by the same production method as for the woven fabric A, except that the concentration of a 1,2-propanediol-derived component in the PET polymer was 408 ppm. The woven fabric showed a modulus of a circular specimen deformed by 10% in an arbitrary direction within the range from 13 to 30 N/cm and an elongation at break in an arbitrary direction within the range from 47 to 57%.

Production of Woven Fabric F

A woven fabric with a thickness of 0.64 mm and a basis weight of 210 g/m$^2$ was obtained by the same production method as for the woven fabric A, except that the concentration of a 1,2-propanediol-derived component in the PET polymer was 2 ppm. The woven fabric showed a modulus of a circular specimen deformed by 10% in an arbitrary direction within the range from 16 to 33 N/cm and an elongation at break in an arbitrary direction within the range from 48 to 60%.

Production of Woven Fabric G

A woven fabric with a thickness of 0.64 mm and a basis weight of 210 g/m$^2$ was obtained by the same production method as for the woven fabric A, except that no 1,2-propanediolderived component was contained in the PET polymer. The woven fabric showed a modulus of a circular specimen deformed by 10% in an arbitrary direction within the range from 14 to 29 N/cm and an elongation at break in an arbitrary direction within the range from 53 to 65%.

Production of Woven Fabric H

A woven fabric with a thickness of 0.64 mm and a basis weight of 210 g/m$^2$ was obtained by the same production method as for the woven fabric A, except that the concentration of a 1,2-propanediol-derived component in the PET polymer was 612 ppm. The woven fabric showed a modulus of a circular specimen deformed by 10% in an arbitrary direction within the range from 17 to 33 N/cm and an elongation at break in an arbitrary direction within the range from 47 to 61%.

Production of Woven Fabric I

Polyethylene terephthalate (PET) fibers were spun from a PET polymer containing a 1,2-propanediol-derived component at a concentration of 15 ppm and having an inherent viscosity (IV) of 0.68, and drawn, and then used to obtain a composite yarn with 44 dtex consisting of 18 filaments. After texturizing the composite yarn, a satin weave fabric with a density of 80 g/m$^2$ was obtained using the textured composite yarn and a 28-gauge tricot machine, and the obtained satin weave fabric was dyed in black, and a woven fabric with a thickness of 0.30 mm and a basis weight of 90 g/m$^2$ was consequently obtained. The woven fabric showed a modulus of a circular specimen deformed by 10% in an arbitrary direction within the range from 4 to 10 N/cm and an elongation at break in an arbitrary direction within the range from 39 to 64%.

Production of Woven Fabric J

Polyethylene terephthalate (PET) fibers were spun from a PET polymer containing a 1,2-propanediol-derived component at a concentration of 15 ppm and having an inherent viscosity (IV) of 0.68, and drawn, and then used to obtain a composite yarn with 56 dtex consisting of 24 filaments. After texturizing the composite yarn, the textured composite yarn was formed into a high twisted yarn with 1500 T/m. The resultant high twisted yarn was used as both warp and weft to weave a fabric with a water jet loom, and the obtained satin weave fabric with a density of 80 g/m$^2$ was dyed in black, and a woven fabric with a thickness of 0.30 mm and a basis weight of 90 g/m$^2$ was consequently obtained. The woven fabric showed a modulus of a circular specimen deformed by 10% in an arbitrary direction within the range from 12 to 13 N/cm and an elongation at break in an arbitrary direction within the range from 53 to 67%.

Example 1

Skin Sheet and Woven Fabric

The above-described skin sheet A and woven fabric A (knitted fabric) were used as a skin sheet and a woven fabric, respectively.

Attachment of a Skin Sheet with a Woven Fabric

After a polyurethane-based adhesive agent was applied to the above-described woven fabric A at a density of 20 g/m$^2$ in a dotted pattern by using a gravure roll coater, the woven fabric A was bonded to the back surface (opposite to the napped surface) of the skin sheet A to obtain a composite sheet material with a basis weight of 400 g/m$^2$ and a thickness of 1.1 mm. The obtained composite sheet material had a flexible texture and high strength, and showed a strength reduction of 2% after heat pressing, which indicates that the composite sheet material will show less reduction in strength during thermoforming. The result is presented in Table 1.

Example 2

Skin Sheet and Woven Fabric

The above-described skin sheet A and woven fabric B were used as a skin sheet and a woven fabric, respectively.

Attachment of a Skin Sheet with a Woven Fabric

A composite sheet material with a basis weight of 400 g/m$^2$ and a thickness of 1.1 mm was obtained in the same manner as in Example 1, except that the above-described skin sheet A and woven fabric B were used instead. The obtained composite sheet material had a flexible texture and high strength, and showed a strength reduction of 3% after heat pressing, which indicates that the composite sheet material will show less reduction in strength during thermoforming. The result is presented in Table 1.

Example 3

Skin Sheet and Woven Fabric

The above-described skin sheet A and woven fabric C were used as a skin sheet and a woven fabric, respectively.

Attachment of a Skin Sheet with a Woven Fabric

A composite sheet material with a basis weight of 400 g/m$^2$ and a thickness of 1.1 mm was obtained in the same manner as in Example 1, except that the above-described skin sheet A and woven fabric C were used instead. The obtained composite sheet material had a flexible texture and high strength, and showed a strength reduction of 4% after heat pressing, which indicates that the composite sheet material will show less reduction in strength during thermoforming. The result is presented in Table 1.

Example 4

Skin Sheet and Woven Fabric

The above-described skin sheet A and woven fabric D were used as a skin sheet and a woven fabric, respectively.

Attachment of a Skin Sheet with a Woven Fabric

A composite sheet material with a basis weight of 400 g/m$^2$ and a thickness of 1.1 mm was obtained in the same manner as in Example 1, except that the above-described skin sheet A and woven fabric D were used instead. The obtained composite sheet material had a flexible texture and high strength, and showed a strength reduction of 4% after heat pressing, which indicates that the composite sheet material will show less reduction in strength during thermoforming. The result is presented in Table 1.

Example 5

Skin Sheet and Woven Fabric

The above-described skin sheet A and woven fabric E were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet A and woven fabric E were used instead. The obtained composite sheet material had a flexible texture and high strength, and showed a strength reduction of 5% after heat pressing, which indicates that the composite sheet material will show less reduction in strength during thermoforming. The result is presented in Table 1.

Example 6

Skin Sheet and Woven Fabric

The above-described skin sheet A and woven fabric F were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet A and woven fabric F were used instead. The obtained composite sheet material had a flexible texture and high strength, and showed a strength reduction of 5% after heat pressing, which indicates that the composite sheet material will show less reduction in strength during thermoforming. The result is presented in Table 1.

Example 7

Skin Sheet and Woven Fabric

The above-described skin sheet B and woven fabric A were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet B and woven fabric A were used instead. The obtained composite sheet material had a flexible texture and high strength, and showed a strength reduction of 2% after heat pressing, which indicates that the composite sheet material will show less reduction in strength during thermoforming. The result is presented in Table 1.

Example 8

Skin Sheet and Woven Fabric

The above-described skin sheet C and woven fabric A were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet C and woven fabric A were used instead. The obtained composite sheet material had a flexible texture and high strength, and showed a strength reduction of 2% after heat pressing, which indicates that the composite sheet material will show less reduction in strength during thermoforming. The result is presented in Table 1.

Example 9

Skin Sheet and Woven Fabric

The above-described skin sheet D and woven fabric A were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet D and woven fabric A were used instead. The obtained composite sheet material had a flexible texture and high strength, and showed a strength reduction of 2% after heat pressing, which indicates that the composite sheet material will show less reduction in strength during thermoforming. The result is presented in Table 1.

Example 10

Skin Sheet and Woven Fabric

The above-described skin sheet E and woven fabric A were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet E and woven fabric A were used instead. The obtained composite sheet material had a flexible texture and high strength, and showed a strength reduction of 2% after heat pressing, which indicates that the composite sheet material will show less reduction in strength during thermoforming. The result is presented in Table 1.

Example 11

Skin Sheet and Woven Fabric

The above-described skin sheet F and woven fabric A were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet F and woven fabric A were used instead. The obtained composite sheet material showed slightly lower wear resistance but had a flexible texture and high strength, and showed a strength reduction of 2% after heat pressing, which indicates that the composite sheet material will show less reduction in strength during thermoforming. The result is presented in Table 1.

Example 12

Skin Sheet and Woven Fabric

The above-described skin sheet A and woven fabric A were used as a skin sheet and a woven fabric, respectively.

Attachment of a Skin Sheet with a Woven Fabric

After a polyamide-based adhesive agent was applied to the above-described woven fabric A at a density of 20 g/m² in a dotted pattern by using a gravure roll coater, the knitted fabric A was bonded to the back surface (opposite to the napped surface) of the skin sheet A, and the resultant laminate was hot-pressed by a heated roller machine at 150° C. to obtain a composite sheet material with a basis weight of 400 g/m² and a thickness of 1.1 mm. The obtained composite sheet material had a flexible texture and high strength, and showed a strength reduction of 5% after heat pressing, which indicates that the composite sheet material will show less reduction in strength during thermoforming. The result is presented in Table 1.

Example 13

Skin Sheet and Woven Fabric

The above-described skin sheet G and woven fabric I were used as a skin sheet and a woven fabric, respectively.

Attachment of a Skin Sheet with a Woven Fabric

A composite sheet material with a basis weight of 360 g/m² and a thickness of 1.0 mm was obtained in the same manner as in Example 1, except that the above-described skin sheet G and woven fabric I were used instead. The obtained composite sheet material showed slightly lower shape stability but had a flexible texture, and showed a strength reduction of 2% after heat pressing, which indicates that the composite sheet material will show less reduction in strength during thermoforming. The result is presented in Table 1.

Example 14

Skin Sheet and Woven Fabric

The above-described skin sheet G and woven fabric J were used as a skin sheet and a woven fabric, respectively.

Attachment of a Skin Sheet with a Woven Fabric

A composite sheet material with a basis weight of 360 g/m² and a thickness of 1.0 mm was obtained in the same manner as in Example 1, except that the above-described skin sheet G and woven fabric I were used instead. The obtained composite sheet material had a flexible texture and high strength, and showed a strength reduction of 2% after heat pressing, which indicates that the composite sheet material will show less reduction in strength during thermoforming. The result is presented in Table 1.

Comparative Example 1

Skin Sheet and Woven Fabric

The above-described skin sheet A and woven fabric E were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet A and woven fabric E were used instead. The obtained composite sheet material had a flexible texture and high strength, but showed a strength reduction of 6% after heat pressing, which indicates that the composite sheet material will show slightly more reduction in strength during thermoforming. The result is presented in Table 1.

Comparative Example 2

Skin Sheet and Woven Fabric

The above-described skin sheet A and woven fabric F were used as a skin sheet and a woven fabric, respectively.

Attachment of a Skin Sheet with a Woven Fabric

A composite sheet material with a basis weight of 400 g/m² and a thickness of 1.1 mm was obtained in the same manner as in Example 1, except that the above-described skin sheet A and woven fabric F were used instead. The obtained composite sheet material had a flexible texture and high strength, but showed a strength reduction of 6% after heat pressing, which indicates that the composite sheet material will show slightly more reduction in strength during thermoforming. The result is presented in Table 1.

TABLE 1

| | Composite Sheet Material | | | | | | | |
|---|---|---|---|---|---|---|---|---|
| | Skin sheet | | | | Woven Fabric | | | |
| Unit | Average single fiber diameter of ultra-fine fibers Mm | Content of 1,2-propanediol in the polyester that forms polyester fibers in an entangled fiber network ppm | A woven fabric integrated with a non-woven fabric by fiber entanglement — | Basis weight of a skin sheet g/m² | Content of 1,2-propanediol in the polyester that forms polyester fibers ppm | Basis weight of a woven fabric g/m² | Modulus of a woven fabric at 10% deformation of a circular specimen in an arbitrary direction N/cm | Elongation at break of a woven fabric in an arbitrary direction % |
| Example 1 | 3.1 | 15 | Absent | 170 | 15 | 210 | 15~31 | 50~64 |
| Example 2 | 3.1 | 15 | Absent | 170 | 72 | 210 | 16~31 | 51~63 |
| Example 3 | 3.1 | 15 | Absent | 170 | 195 | 210 | 14~30 | 49~65 |
| Example 4 | 3.1 | 15 | Absent | 170 | 7 | 210 | 17~32 | 48~59 |
| Example 5 | 3.1 | 15 | Absent | 170 | 408 | 210 | 13~30 | 47~57 |
| Example 6 | 3.1 | 15 | Absent | 170 | 2 | 210 | 16~33 | 48~60 |
| Example 7 | 4.4 | 15 | Absent | 170 | 15 | 210 | 15~31 | 50~64 |
| Example 8 | 2.0 | 15 | Absent | 170 | 15 | 210 | 15~31 | 50~64 |
| Example 9 | 5.5 | 15 | Absent | 170 | 15 | 210 | 15~31 | 50~64 |
| Example 10 | 0.9 | 15 | Absent | 170 | 15 | 210 | 15~31 | 50~64 |
| Example 11 | 3.1 | 0 | Absent | 170 | 15 | 210 | 15~31 | 50~64 |
| Example 12 | 3.1 | 15 | Absent | 170 | 15 | 210 | 15~31 | 50~64 |
| Example 13 | 3.1 | 15 | Present | 250 | 15 | 90 | 4~10 | 39~64 |
| Example 14 | 3.1 | 15 | Present | 250 | 15 | 90 | 12~13 | 53~67 |
| Comparative Example 1 | 3.1 | 15 | Absent | 170 | 0 | 210 | 14~29 | 53~65 |
| Comparative Example 2 | 3.1 | 15 | Absent | 170 | 612 | 210 | 17~33 | 47~61 |

TABLE 1-continued

|  | | Composite Sheet Material | | | | |
|---|---|---|---|---|---|---|
|  | | Adhesive Agent | | Basis | Reduction in | Amount of |
|  | Unit | Adhesive Resin — | Basis weight of an adhesive agent g/m² | weight of composite sheet material g/m² | strength after heat pressing process % | composite sheet material worn off mg |
|  | Example 1 | Polyurethane | 20 | 400 | 2 | 5 |
|  | Example 2 | Polyurethane | 20 | 400 | 3 | 5 |
|  | Example 3 | Polyurethane | 20 | 400 | 4 | 5 |
|  | Example 4 | Polyurethane | 20 | 400 | 4 | 5 |
|  | Example 5 | Polyurethane | 20 | 400 | 5 | 5 |
|  | Example 6 | Polyurethane | 20 | 400 | 5 | 5 |
|  | Example 7 | Polyurethane | 20 | 400 | 2 | 5 |
|  | Example 8 | Polyurethane | 20 | 400 | 2 | 5 |
|  | Example 9 | Polyurethane | 20 | 400 | 2 | 5 |
|  | Example 10 | Polyurethane | 20 | 400 | 2 | 5 |
|  | Example 11 | Polyurethane | 20 | 400 | 2 | 9 |
|  | Example 12 | Polyamide | 20 | 400 | 5 | 5 |
|  | Example 13 | Polyurethane | 20 | 360 | 2 | 5 |
|  | Example 14 | Polyurethane | 20 | 360 | 2 | 5 |
|  | Comparative Example 1 | Polyurethane | 20 | 400 | 6 | 5 |
|  | Comparative Example 2 | Polyurethane | 20 | 400 | 6 | 5 |

As presented in Table 1, the presence of a 1,2-propanediol-derived component at a concentration of 1 to 500 ppm in fibers that form a woven fabric causes each composite sheet material to lose less strength during thermoforming, when the composite sheet material comprises the woven fabric attached with a skin sheet through an adhesive resin layer.

In contrast, the absence of 1,2-propanediol in fibers that form a woven fabric, as shown in Comparative Example 1, or the presence of excess 1,2-propanediol in fibers that form a woven fabric, as shown in Comparative Example 2, leads to a larger strength reduction in the composite sheet materials after heat pressing, as compared to that shown in any composite sheet material with a woven fabric that is formed from fibers containing a 1,2-propanediol-derived component at a concentration of 1 to 500 ppm.

The invention claimed is:

1. A composite sheet material comprising a skin sheet attached with a woven fabric through an adhesive resin layer, wherein 1) the skin sheet is made of an entangled fiber network comprising ultra-fine fibers with an average single fiber diameter of 0.1 to 8 μm and an elastic polymer, 2) the woven fabric comprises polyester fibers in which the polyester contains a 1,2-propanediol-derived component at a concentration of 1 to 500 ppm, and 3) an adhesive resin that forms the adhesive resin layer is a moisture-curable resin comprising a polyurethane resin.

2. The composite sheet material according to claim 1, wherein the woven fabric has a modulus of not less than 5 N/cm and not more than 40 N/cm at 10% deformation of a circular specimen in an arbitrary direction, and has an elongation at break of not less than 25% in an arbitrary direction.

3. The composite sheet material according to claim 1, wherein the entangled fiber network comprises polyester fibers in which the polyester contains a 1,2-propanediol-derived component at a concentration of 1 to 500 ppm.

* * * * *